United States Patent
Gregg et al.

(10) Patent No.: US 7,836,254 B2
(45) Date of Patent: Nov. 16, 2010

(54) CACHE INJECTION USING SPECULATION

(75) Inventors: Thomas A. Gregg, Highland, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 11/958,440

(22) Filed: Dec. 18, 2007

(65) Prior Publication Data

US 2009/0157966 A1 Jun. 18, 2009

(51) Int. Cl.
*G06F 12/00* (2006.01)
*G06F 13/00* (2006.01)
*G06F 13/28* (2006.01)

(52) U.S. Cl. ................ 711/122; 711/137; 711/E12.043

(58) Field of Classification Search ................ 711/122, 711/137, E12.043
See application file for complete search history.

(56) References Cited

U.S. PATENT DOCUMENTS

| | | |
|---|---|---|
| 2005/0240652 A1 | 10/2005 | Crick |
| 2005/0246500 A1* | 11/2005 | Iyer et al. .................. 711/137 |
| 2006/0095679 A1 | 5/2006 | Edirisooriya |

OTHER PUBLICATIONS

Milenkovic et al., A Performance Evaluation of Cache Injection in Bus-based Shared Memory Multiprocessors, University of Alabama in Huntsville, 2002, http://www.ece.uah.edu/~milenka/docs/milenkovic_cono00.pdf, 12 pages.

Milenkovic, Achieving High Performance in Bus-based Shared Memory Multiprocessors, IEEE Concurrency, 2002, http://www.ece.uah.edu/~milenka/docs/milenkovic_cono00.pdf, pp. 36-44.

U.S. Appl. No. 11/958,418, filed on Dec. 18, 2007.
U.S. Appl. No. 11/958,424, filed on Dec. 18, 2007.
U.S. Appl. No. 11/958,431, filed on Dec. 18, 2007.
U.S. Appl. No. 11/958,435, filed on Dec. 18, 2007.
U.S. Appl. No. 11/958,445, filed on Dec. 18, 2007.

* cited by examiner

*Primary Examiner*—Matt Kim
*Assistant Examiner*—Ralph A Verderamo
(74) *Attorney, Agent, or Firm*—Cantor Colburn LLP; Steven Chiu

(57) ABSTRACT

A method, system, and computer program product for cache injection using speculation are provided. The method includes creating a cache line indirection table at an input/output (I/O) hub, which includes fields and entries for addresses, processor ID, and cache type and includes cache level line limit fields. The method also includes setting cache line limits to the CLL fields and receiving a stream of contiguous addresses at the table. For each address in the stream, the method includes: looking up the address in the table; if the address is present in the table, inject the cache line corresponding to the address in the processor complex; if the address is not present in the table, search limit values from the lowest level cache to the highest level cache; and inject addresses not present in the table to the cache hierarchy of the processor last injected from the contiguous address stream.

18 Claims, 7 Drawing Sheets

CACHE INJECTION USING SPECULATION

BACKGROUND OF THE INVENTION

The present disclosure relates generally to data processing and, in particular, to a method, system, and computer program product for cache injection using speculation.

Cache injection is used to inject data into caches within a multiprocessor environment. Flat SMP (Symmetrical Multiprocessor) architectures use a snoopy broadcast bus or interconnect. Cache injection schemes for flat SMPs use broadcast to inject values, as locations of cache lines are not available in directories. For NUMA (Non-uniform Memory Access) distributed memory machines and SMP machines, storing input/output (I/O) page addresses for all applications in the system chipset or I/O hub in regular form is also not practical. Additionally, storing all possible I/O page addresses at application start time is also not feasible, as the application may dynamically allocate memory and pages for I/O transactions.

What is needed is a way to provide efficient cache injection using protocols that avoid broadcasts, that are prudent with use of storage for inject-able addresses, and that dynamically attempt to determine useful addresses for injection.

BRIEF SUMMARY OF THE INVENTION

Embodiments of the invention include a method for cache injection using speculation. The method includes creating a cache line indirection table at an input/output (I/O) hub, the cache line indirection table including fields and entries for addresses or address ranges, processor ID, and cache type and includes cache level line limit fields for cache levels CL1 through CLn, where CL1 is the lowest level cache in a hierarchically organized cache system. The method also includes setting cache line limits to the cache level line limit fields and receiving a stream of contiguous addresses A1 through An at the cache line indirection table. For each address in the stream, the method includes looking up the address in the cache line indirection table and, if the address is present in the cache line indirection table, injecting the cache line corresponding to the address in the processor complex. If the address is not present in the cache line indirection table, the method includes searching limit values from the lowest level cache to the highest level cache and injecting addresses not present in the cache line indirection table to the cache hierarchy of the processor last injected from the contiguous address stream. The processor last injected has a cached address present in the cache line indirection table and performs injection from lowest level cache to highest level, observing all limit rules.

Further embodiments include a system for cache injection using speculation. The system includes an input/output (I/O) system that includes one of a system chipset and an input/output (I/O) hub, the I/O transaction including an address. The system also includes logic executed on the I/O system. The logic performs a method. The method includes creating a cache line indirection table at an input/output (I/O) hub, the cache line indirection table including fields and entries for addresses or address ranges, processor ID, and cache type and includes cache level line limit fields for cache levels CL1 through CLn, where CL1 is the lowest level cache in a hierarchically organized cache system. The method also includes setting cache line limits to the cache level line limit fields and receiving a stream of contiguous addresses A1 through An at the cache line indirection table. For each address in the stream, the method includes looking up the address in the cache line indirection table and, if the address is present in the cache line indirection table, injecting the cache line corresponding to the address in the processor complex. If the address is not present in the cache line indirection table, the method includes searching limit values from the lowest level cache to the highest level cache and injecting addresses not present in the cache line indirection table to the cache hierarchy of the processor last injected from the contiguous address stream. The processor last injected has a cached address present in the cache line indirection table and performs injection from lowest level cache to highest level, observing all limit rules.

Additional embodiments include a computer program product for cache injection using speculation. The computer program product includes a storage medium readable by a processing circuit and storing instructions for execution by the processing circuit for implementing a method. The method includes creating a cache line indirection table at an input/output (I/O) hub, the cache line indirection table including fields and entries for addresses or address ranges, processor ID, and cache type and includes cache level line limit fields for cache levels CL1 through CLn, where CL1 is the lowest level cache in a hierarchically organized cache system. The method also includes setting cache line limits to the cache level line limit fields and receiving a stream of contiguous addresses A1 through An at the cache line indirection table. For each address in the stream, the method includes looking up the address in the cache line indirection table and, if the address is present in the cache line indirection table, injecting the cache line corresponding to the address in the processor complex. If the address is not present in the cache line indirection table, the method includes searching limit values from the lowest level cache to the highest level cache and injecting addresses not present in the cache line indirection table to the cache hierarchy of the processor last injected from the contiguous address stream. The processor last injected has a cached address present in the cache line indirection table and performs injection from lowest level cache to highest level, observing all limit rules.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
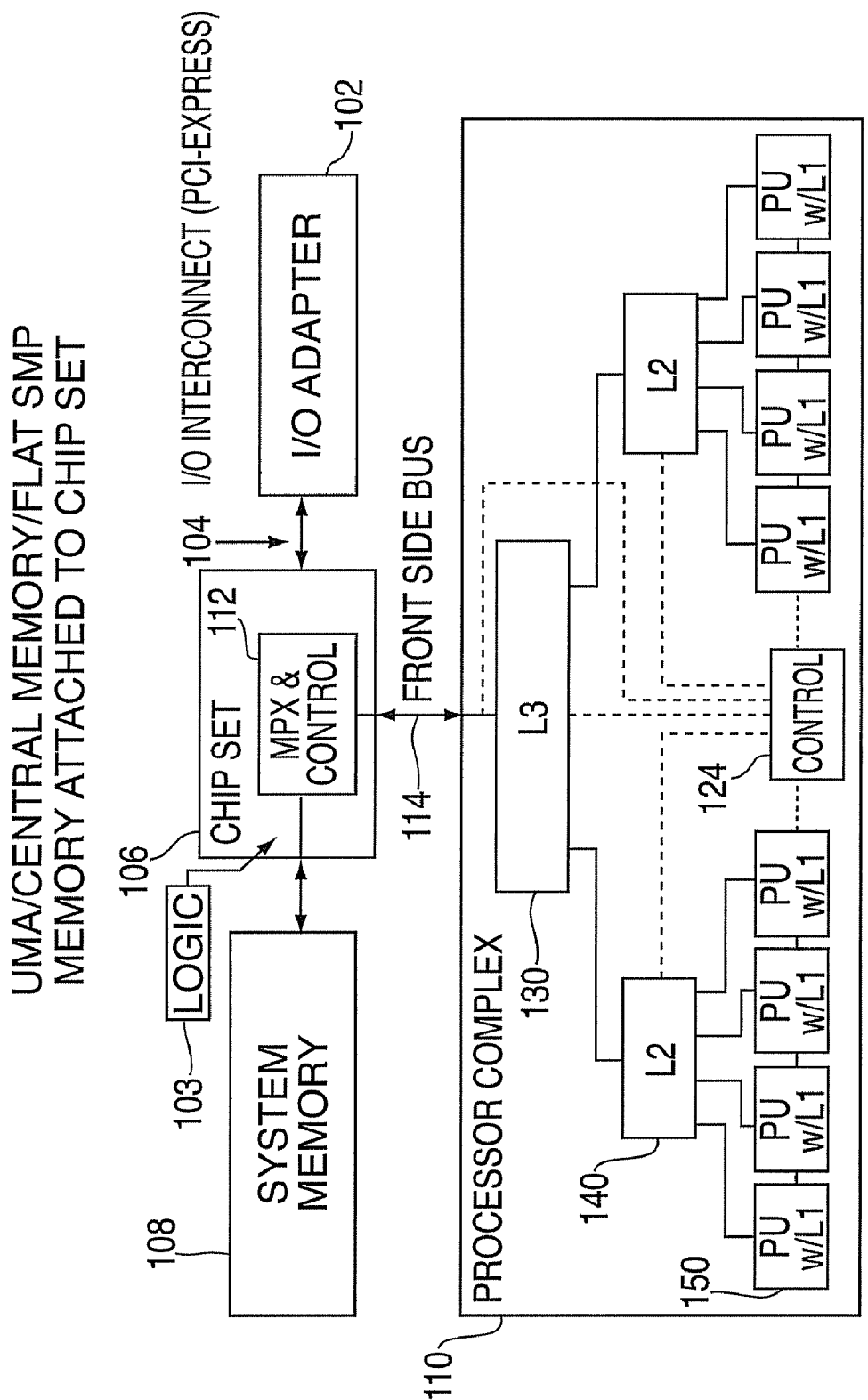
FIG. 1 is a symmetrical multiprocessor architecture (SMP) for use in implementing methods for cache injection using speculation via an I/O hub/chipset in accordance with an exemplary embodiment.

Tuning now to FIG. 1, an exemplary system for implementing cache injection using speculation will now be described. The system of FIG. 1 relates to an SMP architecture in which a system memory 108 is coupled with a system chipset 106 or I/O hub (e.g., a system employing Intel® processors). The system includes an I/O adapter 102 coupled to the chipset 106 via a bi-directional I/O interconnect 104 (e.g., PCI Express). The chipset 106 includes a processor and logic 103, and is communicatively coupled to the system memory 108 (also referred to herein as main memory). The chipset 106 is also coupled to a processor complex 110 over a front side bus (FSB) 114. The I/O adapter 102 reads/writes data between the chipset 106 and peripheral devices (not shown).

The processor complex 110 includes multiple processing units, each with a level 1(L1) cache 150. In the embodiment shown in FIG. 1, the processor complex 110 also includes a level 2 (L2) cache 140 and level 3 (L3) cache 130. The levels 130, 140, and 150 of cache represent a storage hierarchy of the processor complex 110. L3 represents a highest cache level (highest memory latency), and L1 represents a lowest cache level (lowest memory latency) in the hierarchy. It will be understood that any number of cache levels may be implemented in order to realize the advantages of the invention. Three levels L1-L3 are provided for illustrative purposes only and are not to be construed as limiting in scope. In addition, as shown in FIG. 1 for illustrative purposes, multiple processing units (PUs) or groups of processing units may share a common Level 2 and Level 3 storage space in the cache hierarchy.

The processor complex 110 also includes a control unit 124 which manages the traffic (e.g., data transfers) associated with transactions occurring within the complex 110 with respect to the cache hierarchy L1-L3. For example, cache controller 124 tracks the status of cache lines and corresponding addresses in memory for which each cache line is associated.

The chipset 106 may include a group of integrated circuits (chips) that work together to perform various tasks. In an exemplary embodiment, the chipset 106 includes a multiplexer (MPX) and controller 112 for directing the traffic associated with transactions occurring among the I/O adapter 102, the system memory 108, and the processor complex 110 (e.g., read and write transactions). While the embodiment described in FIG. 1 is directed to a chipset 106, it will be understood that other devices may be utilized in implementing the cache injection using speculation (e.g., cards, boards, etc.).

As described above, conventional systems perform cache injection by broadcasting data values of a transaction to each of the caches in a hierarchically organized cache system. This is reflected in FIG. 1 by the solid lines directly interconnecting MPX 112 to L3, L3 to L2, and L2 to L1. The cache injection using speculation using I/O hub/chipset resources described in these exemplary embodiments utilize logic executing on the system chipset 106 (e.g., software/firmware) to perform I/O hub/chipset-side target CPU determination during cache injection to inject data values for a transaction directly into an identified target processor's cache, as shown e.g., by the dotted lines in the processor complex 110 of FIG. 1.

Figure 2:
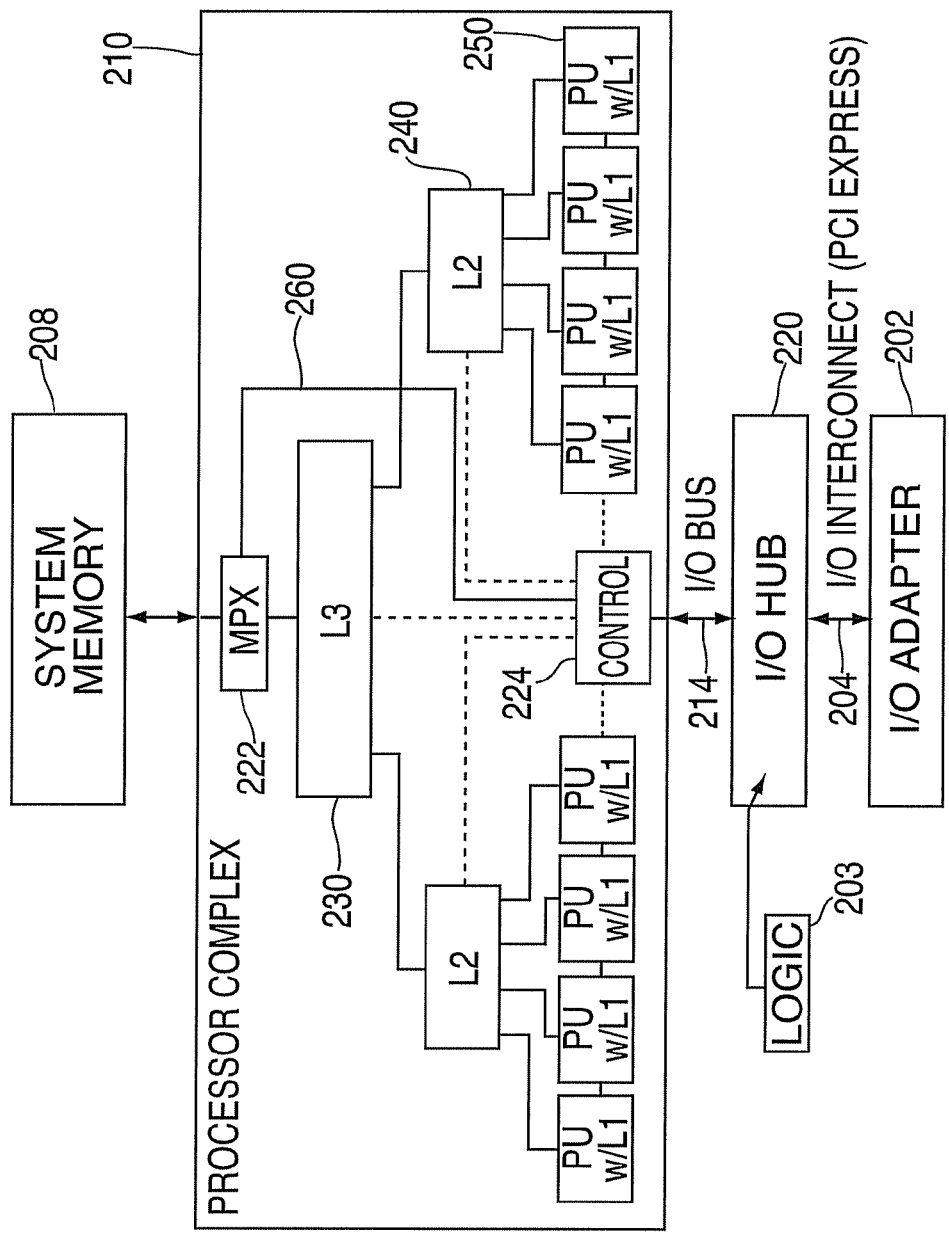
FIG. 2 is a symmetrical multiprocessor architecture (SMP) for use in implementing cache injection using state via an I/O hub/chipset in accordance with another exemplary embodiment.

Turning now to FIG. 2, a system upon which the cache injection using speculation may be implemented in accordance with another exemplary embodiment will now be described. The system of FIG. 2 relates to an SMP architecture in which a system memory 208 is coupled with a processor complex 210 (e.g., a system employing AMD® or IBM® System z™ or p™ processors). Various components of the system of FIG. 2 overlap in function with components described above in FIG. 1. To this extent, these components and/or functions will not be described in detail. The system of FIG. 2 includes an I/O adapter 202 in communication with an I/O hub 220 over an I/O interconnect 204 (e.g., PCIe). The I/O hub 220 includes a processor and logic 203, and is communicatively coupled to the processor complex 210 via an I/O bus 214. The processor complex 210, likewise, is communicatively coupled to the system memory 208 (also referred to as main memory). The processor complex 210 includes a cache hierarchy with three levels of cache, namely L1 250, L2 240, and L3 230. The I/O hub 220 communicates with the processor complex 210 via a control unit 224 which directs traffic between the I/O hub 220, the cache hierarchy, and the system memory 208 via a multiplexer 222.

The I/O adapter 202 reads/writes data to the processor complex 210 and the system memory 208 via the I/O interconnect 204, I/O hub 220, I/O bus 214 and MPX 222. For example, in a conventional cache injection process, the data transaction or request is generated in the I/O adapter 102 and distributed over the I/O interconnect 204 to the I/O hub 220 using, e.g., PCI Express protocols. The I/O hub 220 performs a translation (e.g., transforming the PCI Express protocols to those in which the I/O bus 214 will understand) and distributes the translated data over the I/O bus 214 to the control unit 224 where it is sent directly to the L3 cache 230. The cache injection using speculation of the exemplary embodiments utilize logic 203 executing on the I/O hub 220 (e.g., software/firmware) to perform host-side target CPU determination during cache injection, such that the data values in an I/O transaction may be directed injected into a target processor's cache, as opposed to a general broadcast to all of the cache locations in the processor complex 210. This is shown in FIG. 2 by the dotted lines from the control unit 224 representing wires used to activate and target a specific cache.

Figure 3:
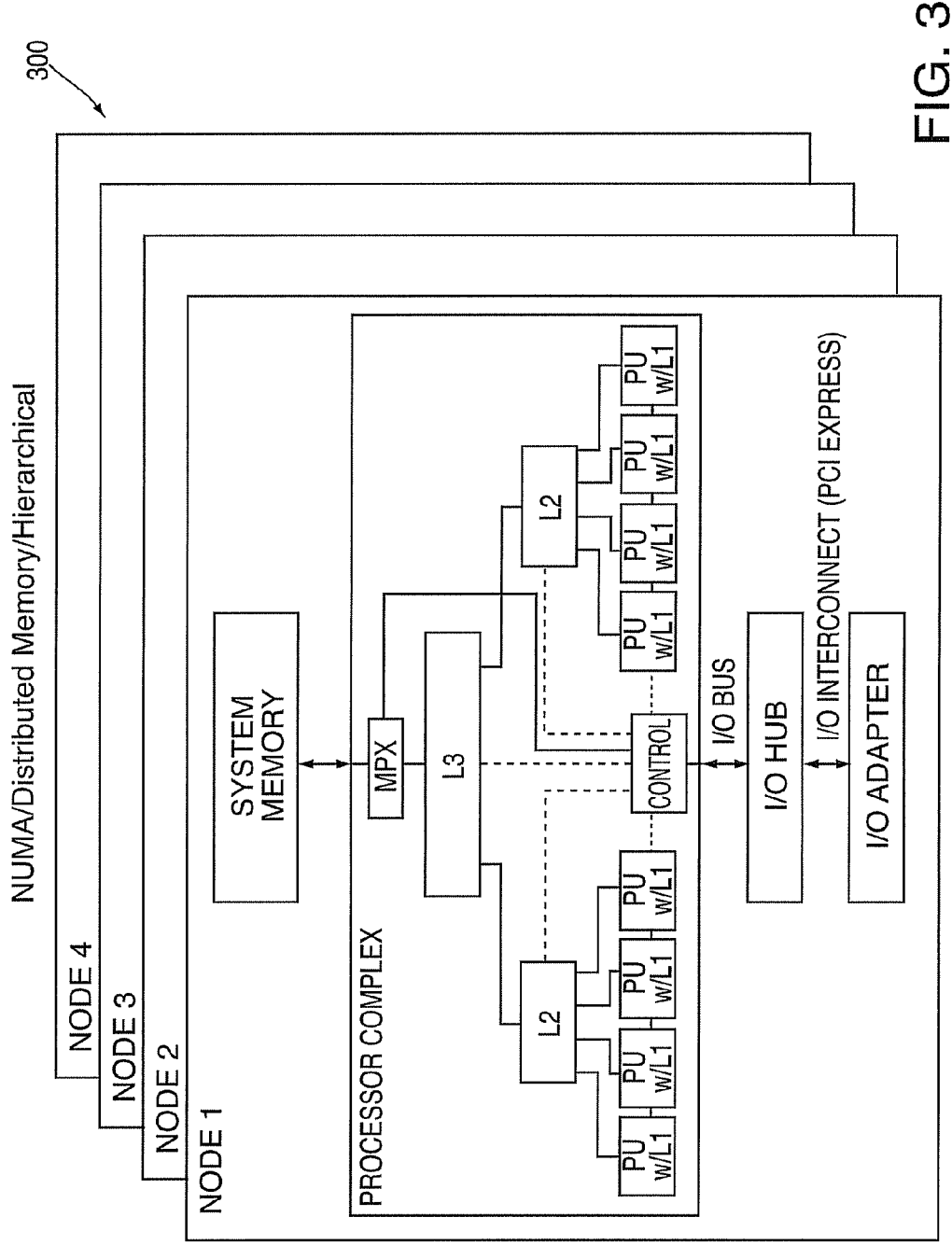
FIG. 3 is a non-uniform memory access (NUMA) architecture with distributed memory for use in implementing cache injection using speculation via an I/O hub/chipset in accordance with yet another exemplary embodiment.

Turning now to FIG. 3, a non-uniform memory access (NUMA) architecture with distributed memory for use in implementing cache injection using speculation will now be described. The system of FIG. 3 includes multiple nodes 300 (Nodes 1-4), which communicate among one another for performing data transactions including the cache injection using speculation described herein. Each of the Nodes 1-4 may include a multiplexer (MPX) (e.g., MPX 222) that steers data to system memory or cache hierarchy in the processor complex. The processor complex for each of Nodes 1-4 are interconnected and communicate with one another to form the NUMA, or distributed, memory model-based machine. Keeping data values coherent in the caches may be implemented, e.g., using scalable directory-based cache coherency techniques or snoopy bus protocols. It will be understood that the cache injection using speculation may be implemented over a system that includes multiple nodes in an SMP architecture as shown, e.g., in FIG. 1 as well. For example, multiple nodes may be interconnected via chipsets of each of the nodes.

In an exemplary embodiment, the cache injection using speculation enables the chipset 106 to inject values into CPU caches by exploiting locality. This is particularly relevant for the SMP architecture of FIG. 2 where an address can be shared by multiple CPUs 250 simultaneously.

Figure 4:
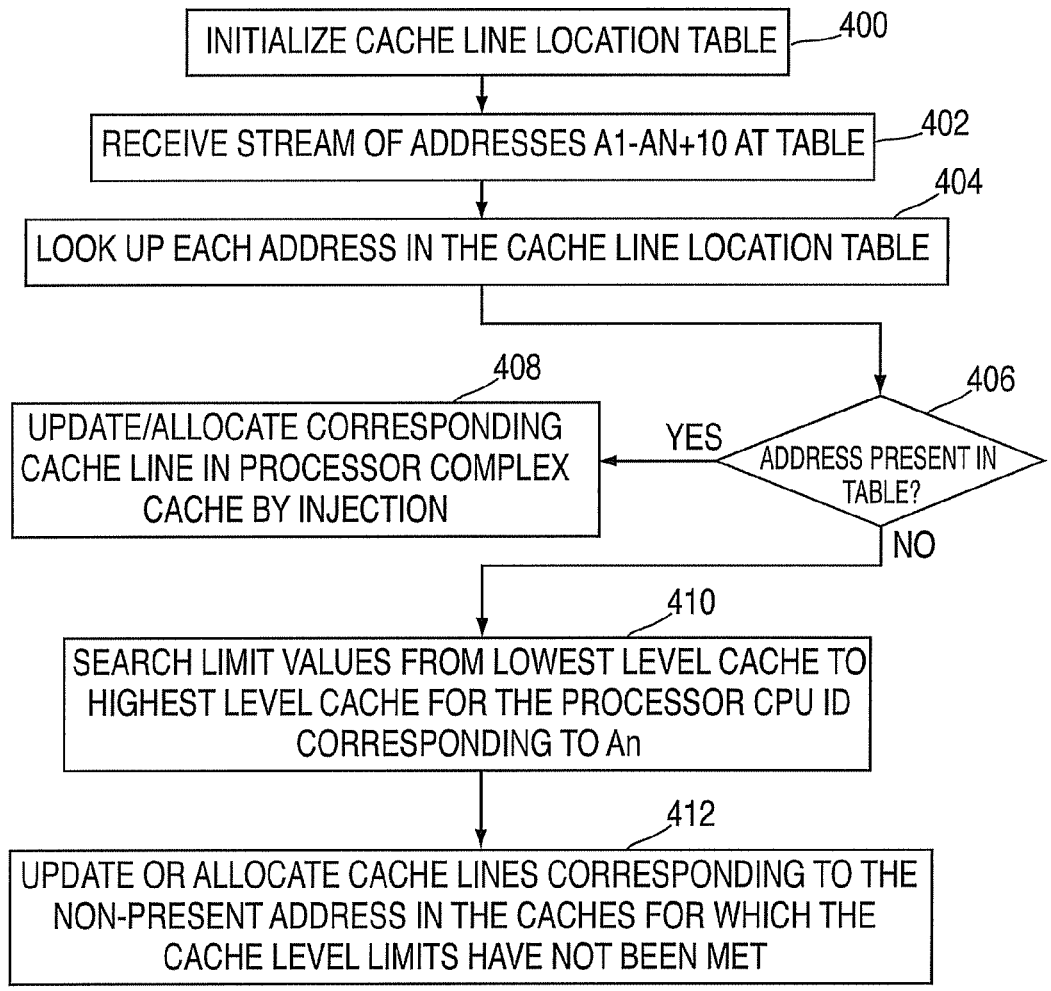
FIG. 4 is a flow diagram describing a process for implementing cache injection using speculation via an I/O hub/chipset in accordance with an exemplary embodiment.
Figure 5:
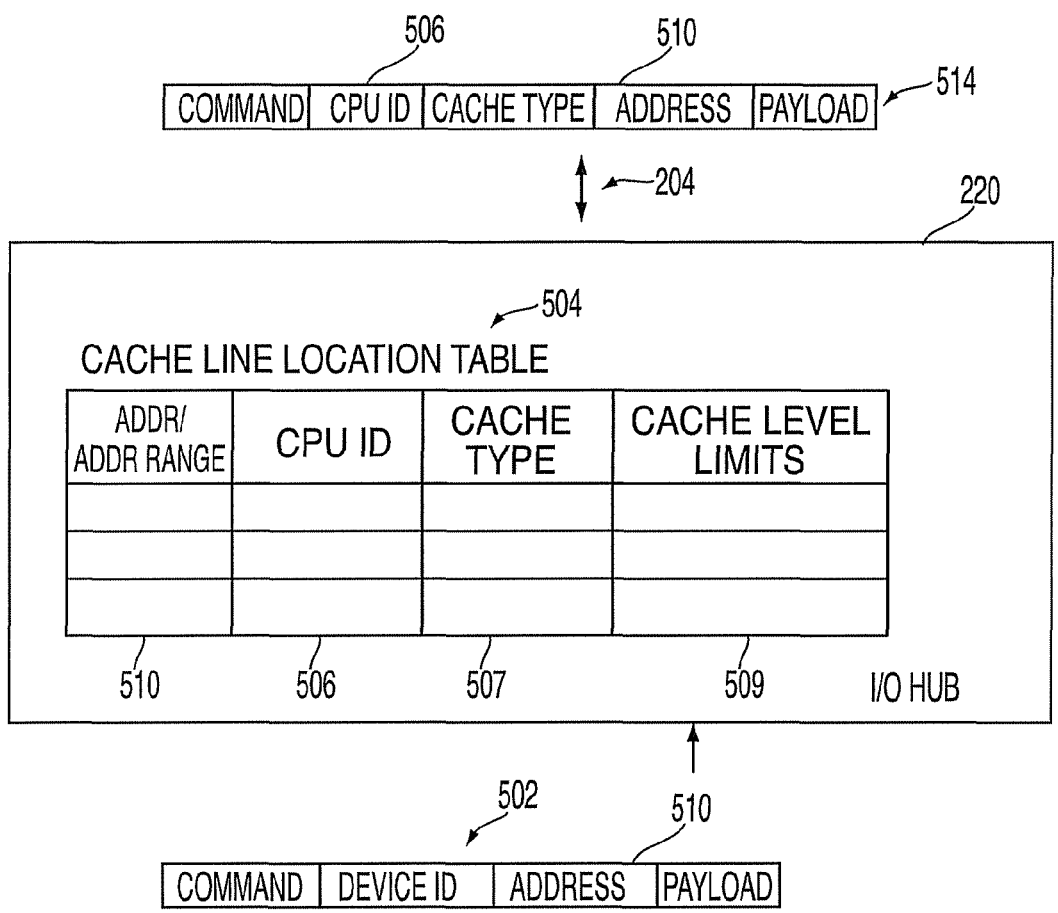
FIG. 5 is a block diagram describing components of an input/output (I/O) hub/chipset used in the system of FIG. 2 in accordance with an exemplary embodiment.

Turning now to FIGS. 4 and 5, an I/O hub (or system chipset 120) and process for implementing the cache injection using speculation will now be described in exemplary embodiments. For purposes of illustration, and by way of non-limiting example, the processes described in FIG. 4 relate to the I/O hub 220 of FIG. 2.

As indicated above, the cache injection using speculation enables I/O host-side methods for target CPU determination for processor units during cache injection. The host-side methods provide a means to perform I/O transactions that exploit spatial locality on the I/O hub 220 or chipset 120 complex 210/110. In an exemplary embodiment, the I/O hub 220 or chipset 120 executes logic 203/103 for implementing the processes described herein.

In an exemplary embodiment, a cache line location table 504 may be used to implement cache injection using speculation. This embodiment is applicable to FIGS. 1-3. In this embodiment, the cache line location table 504, stored on the I/O hub/chipset, includes fields and entries for addresses (or address ranges) 510, CPU ID 506, and cache type 507 (L1, L2, L3 or higher), and the I/O hub/chipset may also include cache level limit fields 509 for cache levels CL1 through CLn, where CL1 is the lowest level cache (e.g., L1) limit in the processor complex 210. Cache line limits for each of the limit fields CL1 through CLn are set (e.g., user defined) and which reflect the maximum number of cache lines that can be allocated or updated outside of the address ranges in the cache line location table for a given transaction or address stream burst.

The cache block indirection table is initialized at step 402. Assume A1 through An+10 are contiguous addresses. Addresses A1 through An are mapped to entries in the cache line location table 504. Upon receiving a stream of addresses A1 through An+10 at the cache line location table 504 at step 402, for each address in the stream, the address in the cache line location table is looked up at step 404. If the address 510 is present in the cache line location table 504 at step 406, the corresponding cache line in the processor complex cache is updated or allocated at step 408.

If the address 510, however, is not present in the cache line location table 504 (An+1 through An+10) at step 406, limit values are searched from the lowest level cache to the highest level cache for the processor (CPU ID) 506 corresponding to An at step 410. The cache lines corresponding to the non-present address are updated or allocated, in the caches for which the cache level limits 509 have not been met at step 412.

This method uses the principle of spatial locality to speculate that, since A1 through An are mapped to entries in the cache line location table, An+1 through An+10 must also be needed by the processor soon and may benefit by injection. This is because A1 through An+10 are contiguous addresses. It will be understood that the cache level limits are reset after a single transaction burst of contiguous addresses. These limits govern the update or allocation of non-stored addresses that are contiguous with stored addresses in the cache line location table 504.

In another embodiment of the present invention, consider the cache line location table 504 described above. Further consider an entry with address range A1-A3 mapped to CPU ID 1 (506) and cache type L3 (507). If an address stream burst A1, A2, A3 arrives via transaction 502 to I/O hub 220 (within the address range entry A1-A3), A1 is sent to L1 (even though the entry was set to L3 only), A2 to L2 and A3 to L3. It will be understood that for an inclusive cache system, A1 will be sent to L1, (A1, A2) to L2 and (A1, A2 and A3) to L3. Although A1-A3 are mapped to cache type L3 in the cache line indirection table 504, it is speculated that these addresses might be needed by the processor soon and it is prudent to stripe cache lines corresponding to addresses across the cache hierarchy. Update or allocation of cache lines may also use per-cache limits as described above, with per-cache limits applying to stored addresses in the table. This embodiment is applicable to FIGS. 1-3.

Figure 6:
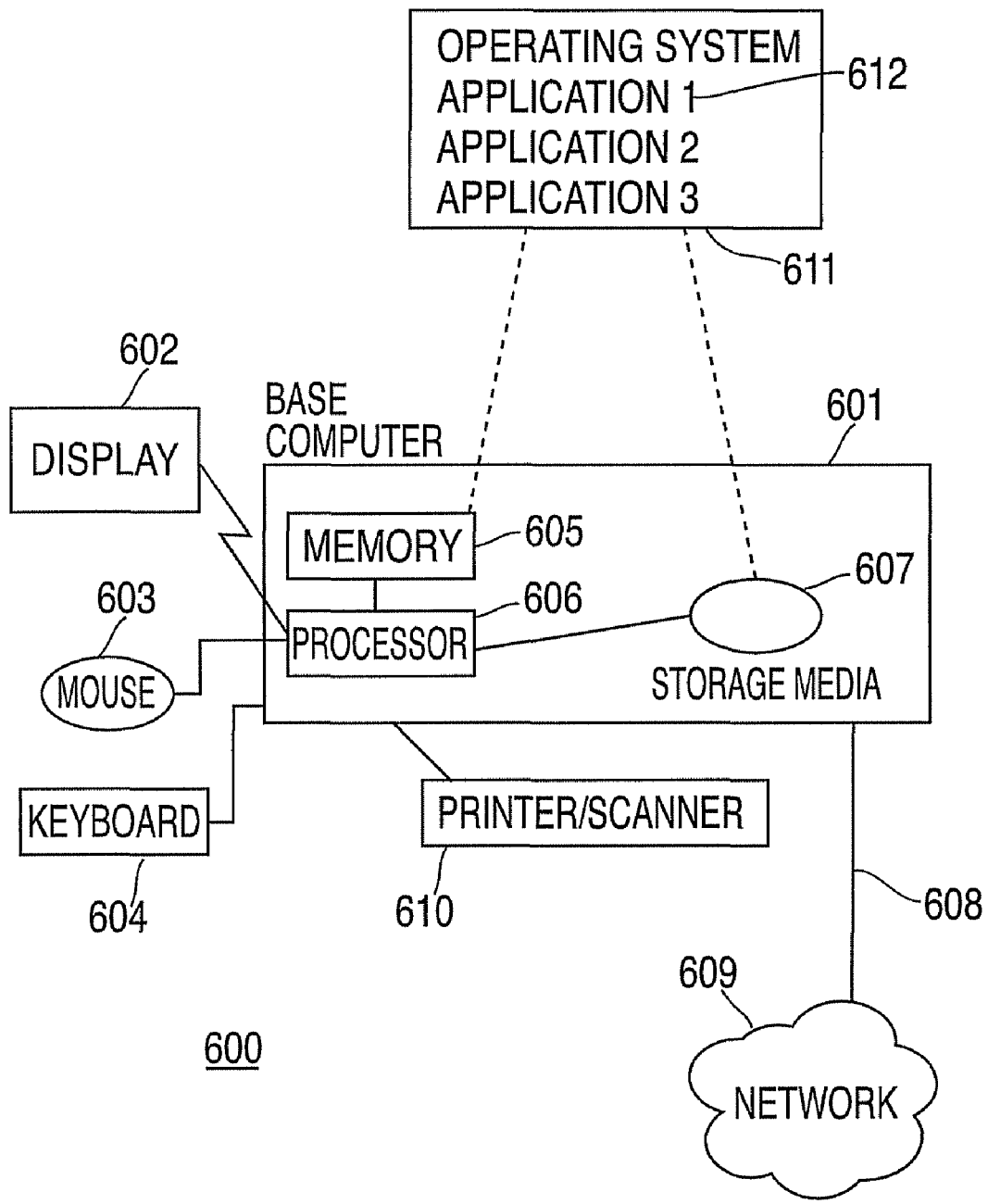
FIG. 6 is a workstation for implementing cache injection using speculation via an I/O hub/chipset in accordance with an exemplary embodiment.

FIG. 6 illustrates a representative workstation or server hardware system in which the present invention may be practiced. The system 600 of FIG. 6 comprises a representative computer system 601, such as a personal computer, a workstation or a server, including optional peripheral devices. The workstation 601 includes one or more processors 606 and a bus employed to connect and enable communication between the processor(s) 606 and the other components of the system 601 in accordance with known techniques. The bus connects the processor 606 to memory 605 and long-term storage 607 which can include a hard drive, diskette drive or tape drive for example. The system 601 might also include a user interface adapter, which connects the microprocessor 606 via the bus to one or more interface devices, such as a keyboard 604, mouse 603, a printer/scanner 610 and/or other interface devices, which can be any user interface device, such as a touch sensitive screen, digitized entry pad, etc. The bus also connects a display device 602, such as an LCD screen or monitor, to the microprocessor 606 via a display adapter.

The system 601 may communicate with other computers or networks of computers by way of a network adapter capable of communicating 608 with a network 609. Example network adapters are communications channels, token ring, Ethernet or modems. Alternatively, the workstation 601 may communicate using a wireless interface, such as a CDPD (cellular digital packet data) card. The workstation 601 may be associated with such other computers in a Local Area Network (LAN) or a Wide Area Network (WAN), or the workstation 601 can be a client in a client/server arrangement with another computer, etc. All of these configurations, as well as the appropriate communications hardware and software, are known in the art.

Figure 7:
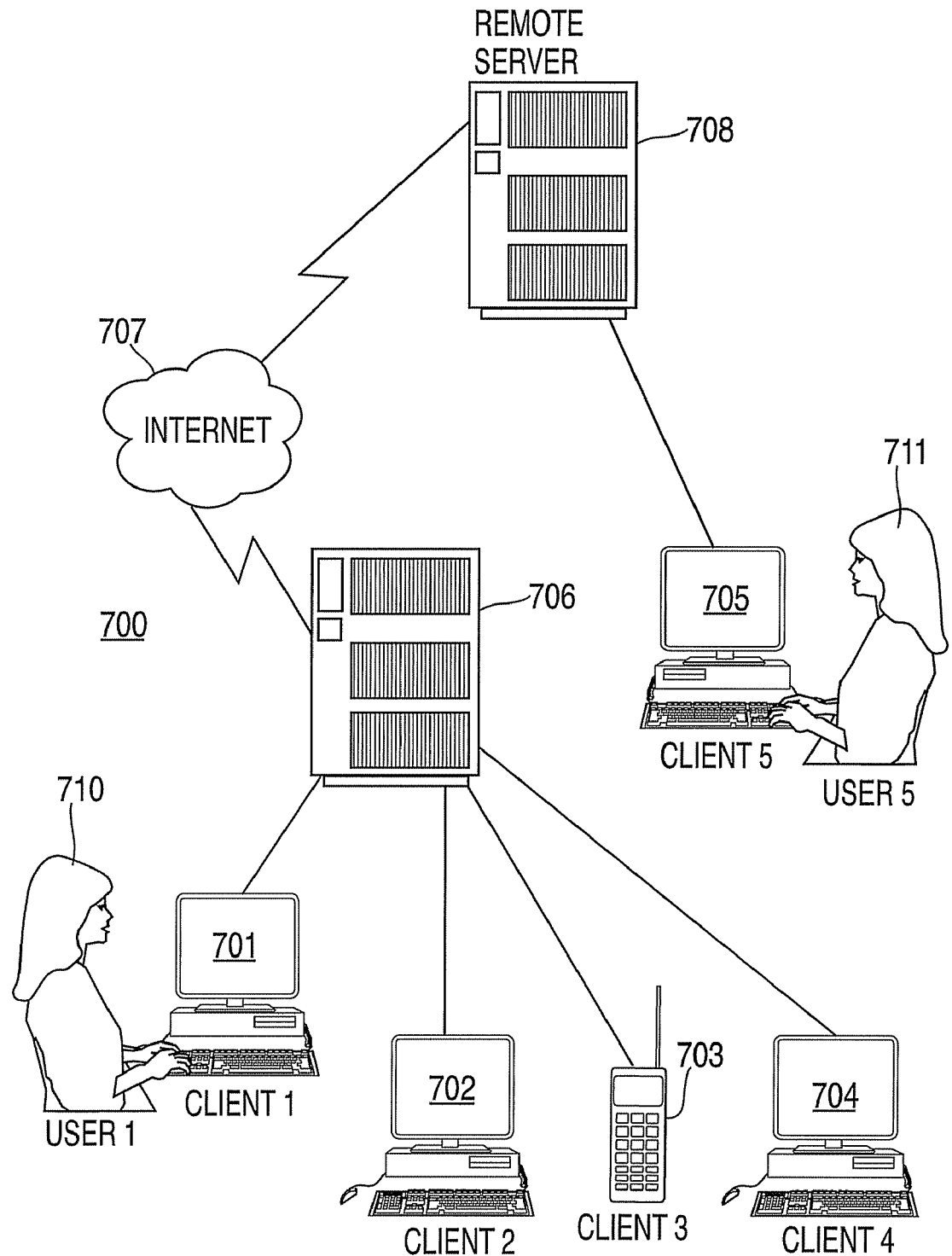
FIG. 7 is a data processing network for implementing cache injection using speculation via an I/O hub/chipset in accordance with an exemplary embodiment.

FIG. 7 illustrates a data processing network 700 in which the present invention may be practiced. The data processing network 700 may include a plurality of individual networks, such as a wireless network and a wired network, each of which may include a plurality of individual workstations 601, 701, 702, 703, and 704. Additionally, as those skilled in the art will appreciate, one or more LANs may be included, where a LAN may comprise a plurality of intelligent workstations coupled to a host processor.

Still referring to FIG. 7, the network may also include mainframe computers or servers, such as a gateway computer (client server 706) or application server (remote server 708 which may access a data repository and may also be accessed directly from a workstation 705). The gateway computer 706 serves as a point of entry into each network 707. A gateway is needed when connecting one networking protocol to another. The gateway 706 may be preferably coupled to another network (the Internet 707 for example) by means of a communications link. The gateway 706 may also be directly coupled to one or more workstations 601, 701, 702, 703, and 704 using a communications link. The gateway computer may be implemented utilizing an IBM eServer zSeries® 600 Server available from IBM Corp.

Software programming code which embodies the present invention is typically accessed by the processor 606 of the system 601 from long-term storage media 607, such as a CD-ROM drive or hard drive. The software programming code may be embodied on any of a variety of known media for use with a data processing system, such as a diskette, hard drive, or CD-ROM. The code may be distributed on such media, or may be distributed to users 710, 711 from the memory or storage of one computer system over a network to other computer systems for use by users of such other systems.

Alternatively, the programming code 611 may be embodied in the memory 605, and accessed by the processor 606 using the processor bus. Such programming code includes an operating system which controls the function and interaction of the various computer components and one or more application programs 612. Program code is normally paged from dense storage media 607 to high-speed memory 605 where it is available for processing by the processor 606. The techniques and methods for embodying software programming code in memory, on physical media, and/or distributing software code via networks are well known and will not be further discussed herein.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for cache injection using speculation, comprising:
creating a cache line indirection table at an input/output (I/O) hub, the cache line indirection table including fields and entries for addresses or address ranges, processor ID, and cache type and includes cache level line limit fields for cache levels CLL1 through CLLn, where CLL1 is the lowest level cache limit in a hierarchically organized cache system for a stored address in the cache line indirection table;
setting cache line limits to the cache level line limit fields;
receiving a stream of contiguous addresses A1 through An at the cache line indirection table; and
for each address in the stream:
looking up the address in the cache line indirection table;
if the address is present in the cache line indirection table, inject the cache line corresponding to the address in the processor complex;
if the address is not present in the cache line indirection table, search limit values from the lowest level cache to the highest level cache; and
inject addresses not present in the cache line indirection table to the cache hierarchy of the processor last injected from the contiguous address stream, the processor last injected has a cached address present in the cache line indirection table, performing injection from lowest level cache to highest level, observing all limit rules.

2. The method of claim 1, wherein the I/O hub operates in a symmetrical multiprocessor architecture.

3. The method of claim 1, wherein the I/O hub operates in a non-uniform memory access architecture.

4. The method of claim 1, further comprising:
initializing the cache line indirection table; and
populating the cache line indirection table with the entries at runtime.

5. The method of claim 4, wherein the entries include at least one of: addresses corresponding to cache affinity scheduled application process (I/O) pages, addresses corresponding to statically pinned application process (I/O) pages, and addresses corresponding to arbitrary input/output (I/O) pages.

6. The method of claim 1, wherein injecting the cache line corresponding to the address in the processor complex includes:
injecting the cache line corresponding to the address in the processor complex caches, directed towards a corresponding CPU and cache type at a given level retrieved from the cache line indirection table; and
additionally performing injection from lowest level cache to a level just lower than that retrieved from the cache line indirection table, observing all limits.

7. A system for cache injection using speculation, comprising:
an input/output (I/O) system comprising at least one of a system chipset and an input/output (I/O) hub, the I/O transaction including an address; and
logic executed on the I/O system, the logic performing:
creating a cache line indirection table at an input/output (I/O) hub, the cache line indirection table including fields and entries for addresses or address ranges, processor ID, and cache type and includes cache level line limit fields for cache levels CLL1 through CLLn, where CLL1 is the lowest level cache limit in a hierarchically organized cache system;

setting cache line limits to the cache level line limit fields;
receiving a stream of contiguous addresses A1 through An at the cache line indirection table; and
for each address in the stream:
looking up the address in the cache line indirection table;
if the address is present in the cache line indirection table, inject the cache line corresponding to the address in the processor complex;
if the address is not present in the cache line indirection table, search limit values from the lowest level cache to the highest level cache; and
inject addresses not present in the cache line indirection table to the cache hierarchy of the processor last injected from the contiguous address stream, the processor last injected has a cached address present in the cache line indirection table, performing injection from lowest level cache to highest level, observing all limit rules.

8. The system of claim 7, wherein the I/O hub operates in a symmetrical multiprocessor architecture.

9. The system of claim 7, wherein the I/O hub operates in a non-uniform memory access architecture.

10. The system of claim 7, wherein logic executing on the I/O system further performs:
initializing the cache line indirection table; and
populating the cache line indirection table with the entries at runtime.

11. The system of claim 10, wherein the entries include at least one of: addresses corresponding to cache affinity scheduled application process (I/O) pages, addresses corresponding to statically pinned application process (I/O) pages, and addresses corresponding to arbitrary input/output (I/O) pages.

12. The system of claim 7, wherein injecting the cache line corresponding to the address in the processor complex includes:
injecting the cache line corresponding to the address in the processor complex caches, directed towards a corresponding CPU and cache type at a given level retrieved from the cache line indirection table; and
additionally performing injection from lowest level cache to a level just lower than that retrieved from the cache line indirection table, observing all limits.

13. A computer program product for cache injection using speculation, the computer program product comprising:
a storage medium readable by a processing circuit and storing instructions for execution by the processing circuit for implementing a method, the method comprising:
creating a cache line indirection table at an input/output (I/O) hub, the cache line indirection table including fields and entries for addresses or address ranges, processor ID, and cache type and includes cache level line limit fields for cache levels CLL1 through CLLn, where CLL1 is the lowest level cache limit in a hierarchically organized cache system;
setting cache line limits to the cache level line limit fields;
receiving a stream of contiguous addresses A1 through An at the cache line indirection table; and
for each address in the stream:
looking up the address in the cache line indirection table;
if the address is present in the cache line indirection table, inject the cache line corresponding to the address in the processor complex;
if the address is not present in the cache line indirection table, search limit values from the lowest level cache to the highest level cache; and
inject addresses not present in the cache line indirection table to the cache hierarchy of the processor last injected from the contiguous address stream, the processor last injected has a cached address present in the cache line indirection table, performing injection from lowest level cache to highest level, observing all limit rules.

14. The computer program product of claim 13, wherein the I/O hub operates in a symmetrical multiprocessor architecture.

15. The computer program product of claim 13, wherein the I/O hub operates in a non-uniform memory access architecture.

16. The computer program product of claim 13, further comprising instructions for implementing:
initializing the cache line indirection table; and
populating the cache line indirection table with the entries at runtime.

17. The computer program product of claim 16, wherein the entries include at least one of: addresses corresponding to cache affinity scheduled application process (I/O) pages, addresses corresponding to statically pinned application process (I/O) pages, and addresses corresponding to arbitrary input/output (I/O) pages.

18. The computer program product of claim 13, wherein injecting the cache line corresponding to the address in the processor complex includes:
injecting the cache line corresponding to the address in the processor complex caches, directed towards a corresponding CPU and cache type at a given level retrieved from the cache line indirection table; and
additionally performing injection from lowest level cache to a level just lower than that retrieved from the cache line indirection table, observing all limits.

* * * * *